Aug. 30, 1927.
F. E. ZAISS
1,640,868
AUTOMATIC HARD CANDY MACHINE
Filed July 1, 1926
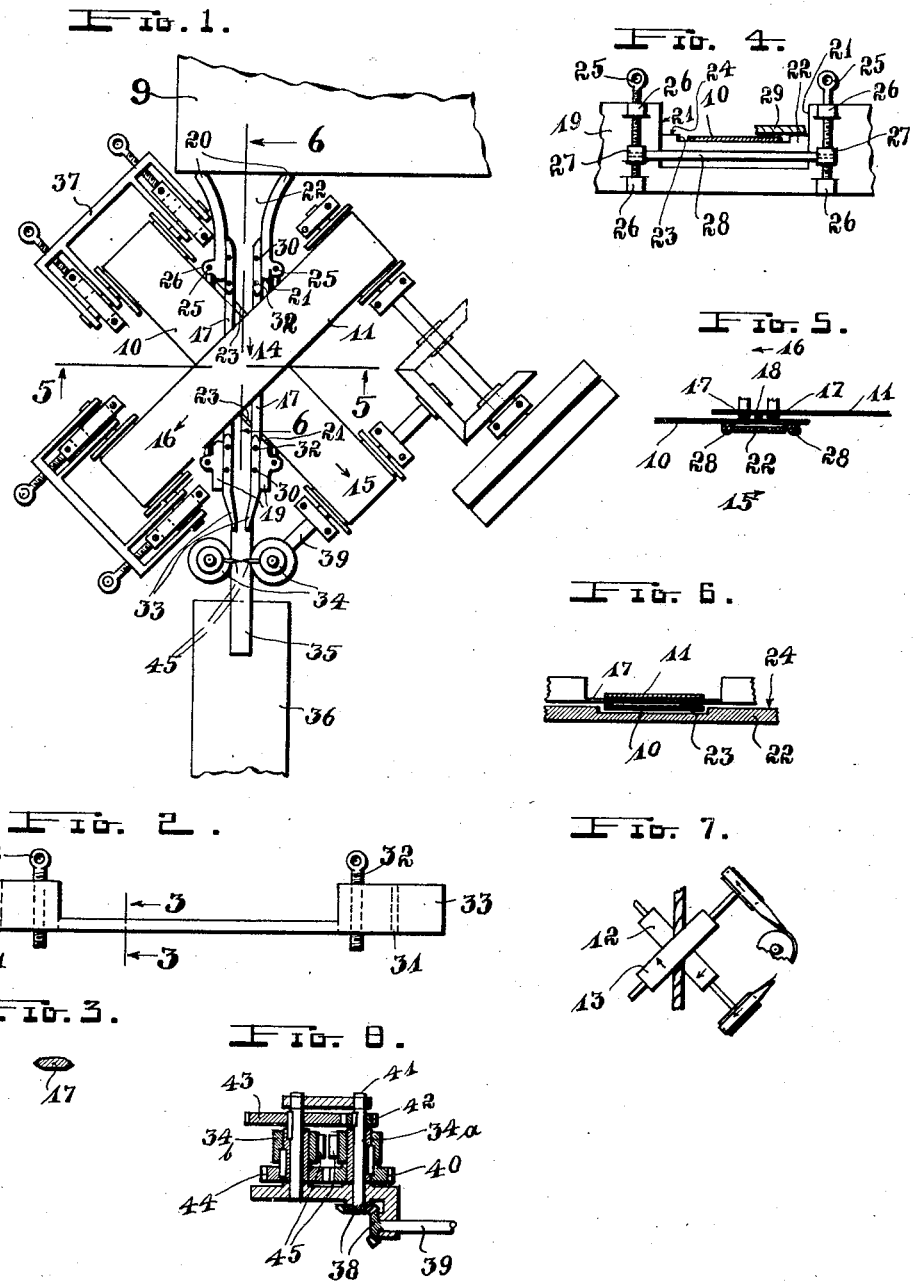
INVENTOR:
Fred E Zaiss Patented Aug. 30, 1927.

1,640,868

UNITED STATES PATENT OFFICE.

FRED E. ZAISS, OF LOS ANGELES, CALIFORNIA.

AUTOMATIC HARD-CANDY MACHINE.

Application filed July 1, 1926. Serial No. 119,877.

This invention relates to devices used in making hard candy.

One of the objects of this invention is to provide a device by which hard candy is automatically drawn and twisted.

Another object is to provide a device by which the drawn candy is automatically cut to a desired length.

Another object is to provide means by which the cutter can be adjusted to operate at various periods or intervals.

Another object is to provide means for adjusting the device to be used with candy of different thickness.

Other objects will appear from the following description and appended claims as well as from the accompanying drawing, in which—

Fig. 1 is a top plan view of a candy machine with drawing and cutting means operating according to the principles of this invention, the timing gears of the cutter being left off, to allow a clearer illustration of the co-operating features between the cutter and the twister.

Fig. 2 is a detail side elevation of an adjustable guide for the belt and the candy passing through the machine.

Fig. 3 is a cross section on line 3—3 of Fig. 2.

Fig. 4 is a fragmentary side elevation of the belt guides in proper relation to the candy guide.

Fig. 5 is a fragmentary cross section through the belts and guides on approximately the lines 5—5 of Fig. 1.

Fig. 6 is a fragmentary section on line 6—6 of Fig. 1, through the belts and portions of the guides.

Fig. 7 is a fragmentary top plan view of a slightly modified form of candy twisting means in form of rollers instead of the belts.

Fig. 8 is a fragmentary vertical general midsectional view of the cutting mechanism.

Candy sticks are customarily made of various materials of different colors, the sticks being commonly so prepared that the different colors appear helically twisted over the candy, the colored material or the coloring, being principally arranged or provided over the outside, visualizing and intensifying the twisted appearance of the candy.

This twisting of the candy is easily accomplished in conjunction with the equalizing and drawing through the machine disclosed herewith.

As illustrated in the drawing, after the dough of the candy has been properly prepared as by heating and mixing, on leaving the working table 9, the candy is passed between transversely disposed movable members in form of rollers, belts, or the like, in Fig. 1, two belts 10 and 11 being used, while in the slightly modified form illustrated in Fig. 7 two rollers 12 and 13 serve to twist and draw the candy.

To produce a simultaneous drawing and twisting of the candy, the belts are preferably actuated in a somewhat forward line though in opposite directions from the longitudinal axis of the machine. One belt is disposed below the space through which the candy is moved, and the other belt is disposed above the space, the belt 10 being in the illustration of Fig. 1 the one disposed below and moving in the direction of the arrow 15, while the belt 11 is the one disposed above and moving in the direction of the arrow 16. It will be noticed that the arrows 15 and 16 point in opposite directions from the central axis of the machine, though both may serve to move the candy in the direction of the arrow 14, especially if the candy is placed between the guide bars as indicated at 18 in Fig. 5, when considered together with the illustration of Fig. 1. The guide bars 17, being disposed between the belts 10 and 11, are adjustable to allow a suitable spacing of the belts in order to facilitate an introduction of candy into the space between the belts.

The guide-support 19 is in form of a trough and is provided with a widened end 20 adjacent to the table 9, by which the candy has easy access to the trough, and to the space between the guides 17. The central portions of the sides of the guide-support are cut away as indicated at 21 in Figs. 1 and 4, providing space for the crossing belts through the opposite sides over the base or bottom 22. The bottom 22 is provided with a recess or cut-out 23, allowing a lowering of the lower belt 10 below the surface 24 of the bottom and for purposes set forth hereafter.

To raise the lower belt 10 to proper supporting position, preferably to a level above the surface 24, adjusting mechanisms are provided on the guide-support 19, on opposite sides of the bottom 22. Set screws 25 are mounted in the lugs 26, carrying fulcrum-blocks 27, to turnably support belt-supporting rollers 28.

By setting the set screws and therewith the fulcrum-blocks 27, the rollers 28 are raised until the lower supported belt 10 reaches a level above the surface 24, so that any candy placed in the trough is carried on the lower belt instead of sliding on the bottom of the guide-support.

However, inasmuch as hard candy is not always made in round sticks, and since a twisting is not always desired, the lower belt may be lowered into the recess or cut-out 23, below the surface 24, in the position indicated in Fig. 4, so that a piece or bar of candy may pass free over the lower belt, as indicated at 29 in Fig. 4. Under these conditions it is possible to feed the candy bar through the machine without material twisting by allowing the upper belt merely to slightly touch such a candy bar, the candy being held between the guides 17 alone in such a case.

Guides 17 of different width may be used, to leave spaces for various sizes of candy bars between the guides. The guides are mounted on pins 30 in the trough, having holes 31 by which the guides are slidingly mounted on such pins, and by which the guides are made exchangeable, so that different sizes of guides may be inserted for different sizes of candy bars. The set screws 32, illustrated in Fig. 2, serve to allow adjustments of the guides for spacing the two belts 10 and 11 while the guides are so mounted on the pins 30.

The terminations 33 of the guides are preferably extended as close as possible to the cutting mechanism. After passing the cutting drums 34, the finished candy is conveyed over the extension-end 35 of the base or bottom 22, to be received by a suitable conveyer 36 for cooling and packing purposes.

Belt-tightening means 37 are provided as illustrated in Fig. 1, facilitating adjustments by which either a twisting or merely a feeding of candy can be accomplished, in the manner described above.

Since the cutting mechanism must, of course, be designed to allow a cutting under different conditions and requirements, no particular details apply, and the several details and parts of the cutting mechanism can only be ascertained and determined on having certain requirements and certain conditions at hand to be dealt with. Different parts must vary under different conditions and requirements. One form of a simple cutting mechanism, however, is illustrated in Fig. 8, to which this invention is not limited as will be understood under the above explanation. This form comprises the driving gears 38, in operative connection with the shaft 39 of the main driving mechanism of the machine. The gear 40 and the first cutting drum $34_a$ are not directly in operative connection with the driving gears 38 but merely mounted on the shaft 41. However, the first timing gear 42 is keyed to the shaft 41, thereby transmitting the motion from the driving gears 38 to the second timing gear 43, and further to the second drum $34_b$ and the second drum-gear 44, through which the first drum-gear 40 receives its motion, to transmit such motion to the first cutting-drum $34_a$.

In this simple form, the cutting drums with their drum-gears 40 and 44 may remain permanently on the shafts in proper operative position, while the timing gears 42 and 43 alone are exchanged when a different cutting is desired or required, in case that longer or shorter candies are wanted. If equal timing gears are inserted, each revolution of the cutting drum, in case one knife is provided on each drum, results in one cut.

If the timing gear 43 is double the size of the timing gear 42, the driving gears 38 through one revolution of the main driving mechanism will bring the cutting drums to turn only half around their axes, or, in other words, two revolutions of the driving gears 38 in conjunction with the main driving mechanism will produce one revolution of the cutting drum and thereby one cut. A candy may in this manner be conveyed through the machine by the main driving mechanism, by belts or rollers, to any desired length in regard to the cutting drums.

Having thus described my invention, I claim:

1. In a candy machine, a trough for conveying matter, conveying members crossing said trough movably, guides disposed axially in said trough and between said members adapted to maintain a certain space between the members.

2. In a candy machine, a base for conveying matter, guides exchangeably mounted on the base in spaced relation to one another, and conveying members movable in relation to said base and on opposite sides of the spaced guides.

3. In a candy machine, a base for conveying matter, guides exchangeably mounted on the base in spaced relation to each other, conveying members movable across the base and over opposite sides of the spaced guides, and cutting means in certain relation to the terminations of the guides for cutting matter in certain lengths after passing through the base and guides.

4. In a candy machine, a base for conveying matter, guides exchangeably mounted on the base in spaced relation to one another, conveying members movable across the base and over opposite sides of the spaced guides, means for spacing said conveying members, and means for raising and lowering one of said members regardless of the other member.

5. In a candy machine, a base for conveying matter, guides exchangeably mounted on the base in spaced relation to one another, conveying members across the base and on opposite sides of the spaced guides, cutting means in certain relation to the guides, and timing means for cutting means.

6. In a candy machine, conveying members disposed across one another, guides disposed between the crossing conveying members, cutting means in certain relation to the guides, and timing means for the cutting means in certain relation to the conveying members.

7. In a candy machine, a trough for conveying candy having a bottom portion and side portions, the side portions being cut away for a certain distance, and the bottom portion having a recess within the space formed by the cut-out side-portions.

8. In a candy machine, a trough for conveying candy having a bottom portion and side portions, the side portions being cut away for a certain distance on opposite sides of the bottom portion and down to the bottom portion, and the bottom portion having a recess across its whole width within the space formed by the cut-out side portions.

9. In a candy machine, a guide mechanism comprising a bar of oval cross section having enlarged end portions, the enlarged end portions being provided with means for holding the guide mechanism in upright position and other means for holding adjusting means.

In testimony that I claim the foregoing as my invention I have signed my name.

FRED E. ZAISS.